United States Patent
Fleckenstein et al.

(10) Patent No.: US 10,745,576 B2
(45) Date of Patent: Aug. 18, 2020

(54) ACRYLATE-BASED MONOMERS FOR USE AS REACTIVE DILUENTS IN PRINTING FORMULATIONS

(71) Applicant: BASF SE, Ludwigshafen am Rhein (DE)

(72) Inventors: Christoph Fleckenstein, Ludwigshafen am Rhein (DE); Juergen Baro, Ludwigshafen am Rhein (DE); Erich Beck, Ludwigshafen am Rhein (DE); Martin Kaller, Ludwigshafen am Rhein (DE); Andrea Misske, Ludwigshafen am Rhein (DE); Friederike Fleischhaker, Ludwigshafen am Rhein (DE)

(73) Assignee: BASF SE (DE)

( * ) Notice: Subject to any disclaimer, the term of this patent is extended or adjusted under 35 U.S.C. 154(b) by 0 days.

(21) Appl. No.: 16/484,896

(22) PCT Filed: Feb. 9, 2018

(86) PCT No.: PCT/EP2018/053304
§ 371 (c)(1),
(2) Date: Aug. 9, 2019

(87) PCT Pub. No.: WO2018/146259
PCT Pub. Date: Aug. 16, 2018

(65) Prior Publication Data
US 2019/0375954 A1  Dec. 12, 2019

(30) Foreign Application Priority Data
Feb. 10, 2017 (EP) .................................. 17155623

(51) Int. Cl.
 *C09D 11/107* (2014.01)
 *C09D 11/101* (2014.01)
 (Continued)

(52) U.S. Cl.
 CPC ........... *C09D 11/107* (2013.01); *B41J 11/002* (2013.01); *C08L 33/14* (2013.01); *C08L 67/06* (2013.01);
 (Continued)

(58) Field of Classification Search
 CPC ........ B41J 2/1433; B41J 2/161; B41J 2/1623; B41J 2202/00; B41J 2202/03;
 (Continued)

(56) References Cited

U.S. PATENT DOCUMENTS

| 5,629,359 A | * | 5/1997 | Peeters | .................... C09D 4/00 |
| | | | | 522/96 |
| 2005/0187310 A1 | * | 8/2005 | Jansen | .................. C03C 25/106 |
| | | | | 522/96 |

(Continued)

FOREIGN PATENT DOCUMENTS

CA  2028541 C  5/2000
EP  0425441 A2  5/1991
(Continued)

OTHER PUBLICATIONS

International Search Report for PCT/EP2018/053303 dated Mar. 14, 2018.
(Continued)

*Primary Examiner* — Manish S Shah
(74) *Attorney, Agent, or Firm* — Faegre Drinker Biddle & Reath LLP

(57) ABSTRACT

The invention relates to compositions, comprising. a) 1.00 to 65.00% by weight of at least one compound of formula (I), wherein $R^1$, $R^2$, $R^3$, $R^4$ are each independently H, $C_1$-$C_6$-alkyl, $C_1$-$C_6$-alkoxy, or $C_1$-$C_6$-alkoxy-$C_1$-$C_6$-alkyl; R is H or $C_1$-$C_6$-alkyl; X is $CR_6R_7$, O, or $NR^8$; $R^6R^7$ are each independently H, $C_1$-$C_6$-alkyl, $C_1$-$C_6$-alkoxy, or $C_1$-$C_6$-alkoxy-$C_1$-$C_6$-alkyl; R8 is H, $C_1$-$C_6$-alkyl, or $C_1$-$C_6$-alkoxy-$C_1$-$C_6$-alkyl; k is 1, 2, 3, 4 or 5, as component A; b) 1.00 to 60.00% by weight of at least one monomer having two (meth)acrylate groups and having a molecular weight of no more than 500 Dalton, as component B; c) 0 to 25% by weight of at least one monomer having at least three (meth)acrylate groups and having a molecular weight of no more than 600 Dalton, as component C; and d) 1.00 to 30.00% by weight of at least one polymer having at least two (meth)acrylate groups and having a molecular weight of at least 700 Dalton, as component D; with the proviso that the amount of components A+B is at least 50% by weight, as well as the use of these compositions as printing inks, in particular inkjet printing inks.

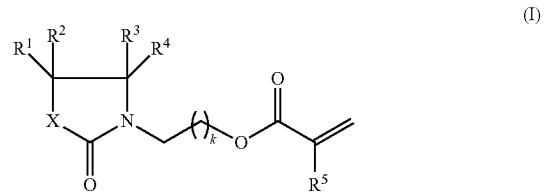

(I)

16 Claims, No Drawings

(51) Int. Cl.
*C09D 11/30* (2014.01)
*B41J 11/00* (2006.01)
*C08L 33/14* (2006.01)
*C08L 67/06* (2006.01)
*C08L 75/14* (2006.01)

(52) U.S. Cl.
CPC ............ *C08L 75/14* (2013.01); *C09D 11/101* (2013.01); *C09D 11/30* (2013.01)

(58) Field of Classification Search
CPC ...... B41J 2/14201; B41J 2/045; B41J 11/002; B41J 2/14; B41J 3/4073; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/107; B41M 5/0011; B41M 5/0017; B41M 5/0047; B41M 7/00; B41M 7/0072; B41M 5/52; B41M 5/5218; C08L 67/06; C08L 33/14; C08L 75/14
See application file for complete search history.

(56) References Cited

U.S. PATENT DOCUMENTS

2007/0146430 A1 6/2007 Nakamura et al.
2009/0227701 A1* 9/2009 Kruger ................ C08F 283/006
                                                    522/174
2010/0313782 A1* 12/2010 Loccufier ................ B41M 1/04
                                                    101/483

FOREIGN PATENT DOCUMENTS

| GB | 2517592 A | 2/2015 |
|----|-----------|--------|
| JP | 2004224841 A | 8/2004 |
| JP | 2005068331 A | 3/2005 |
| JP | 200967826 A | 4/2009 |
| JP | 2010132787 A | 6/2010 |
| JP | 2010248310 A | 11/2010 |
| JP | 2011178863 A | 9/2011 |
| JP | 2015081294 A | 4/2015 |
| WO | WO-2015022228 A1 | 2/2015 |
| WO | WO-2015140538 A1 | 9/2015 |
| WO | WO-2015140539 A1 | 9/2015 |
| WO | WO-2015140540 A1 | 9/2015 |
| WO | WO-2015140541 A1 | 9/2015 |
| WO | WO-2015148094 A1 | 10/2015 |

OTHER PUBLICATIONS

International Search Report for PCT/EP2018/053304 dated Mar. 13, 2018.
Written Opinion of the International Searching Authority for PCT/EP2018/053303 dated Mar. 14, 2018.
Written Opinion of the International Searching Authority for PCT/EP2018/053304 dated Mar. 13, 2018.

* cited by examiner

ACRYLATE-BASED MONOMERS FOR USE AS REACTIVE DILUENTS IN PRINTING FORMULATIONS

CROSS-REFERENCE TO RELATED APPLICATIONS

This application is a national stage application (under 35 U.S.C. § 371) of PCT/EP2018/053304, filed Feb. 9, 2018, which claims benefit of European Application No. 17155623.6, filed Feb. 10, 2017, both of which are incorporated herein by reference in their entirety.

The invention relates to compositions, comprising a particular (meth)acrylate monomer, as well as the use of these compositions as printing inks, preferably inkjet printing inks. Furthermore, the invention relates to a method for printing, preferably inkjet printing, which uses these compositions.

Radiation curable compositions are commonly used as printing inks, in particular inkjet printing inks. Recently developed systems are disclosed in, e.g., GB 2517592 A, WO 2015/140538, WO 2015/140539, WO 2015/140540, WO 2015/140541, WO 2015/148094, and WO 2015/022228. However, there is an ongoing need for curable compositions which combine low viscosity, high reactivity, and good adhesion on the huge manifold of plastic substrates.

N-vinyl-pyrrolidone (NVP) and N-vinyl-caprolactam (NVC) are well-known reactive diluents. However, due to certain health concerns associated therewith and the risk labelling resulting from it, the use of these monomers is getting more and more restricted due to increasing lack of end-user acceptance because of their toxicity in handling and using these monomers. Therefore, it is a further objective to provide curable compositions which do not require the presence of N-vinyl-pyrrolidone (NVP) and/or N-vinyl-caprolactam (NVC).

It has now been found that particular (meth)acrylate monomers are particularly useful as a reactive diluent in curable compositions, such as printing inks, preferably inkjet printing inks. Accordingly, in one aspect of the invention there is provided a composition, comprising, and preferably consisting of, a) 1.00 to 65.00% by weight of at least one compound of formula (I),

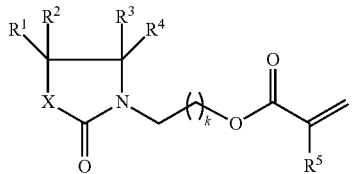

(I)

wherein
$R^1$, $R^2$, $R^3$, $R^4$ are each independently H, $C_1$-$C_6$-alkyl, $C_1$-$C_6$-alkoxy, or $C_1$-$C_6$-alkoxy-$C_1$-$C_6$-alkyl;
$R^5$ is H or $C_1$-$C_6$-alkyl;
X is $CR_6R_7$, O, or $NR^8$;
$R^6$, $R^7$ are each independently H, $C_1$-$C_6$-alkyl, $C_1$-$C_6$-alkoxy, or $C_1$-$C_6$-alkoxy-$C_1$-$C_6$-alkyl;
$R^8$ is H, $C_1$-$C_6$-alkyl, or $C_1$-$C_6$-alkoxy-$C_1$-$C_6$-alkyl;
k is 1, 2, 3, 4 or 5,
as component A;

b) 1.00 to 60.00% by weight of at least one monomer having two (meth)acrylate groups and having a molecular weight no more than 500 Dalton, as component B;

c) 0 to 25% by weight of at least one monomer having at least three (meth)acrylate groups and having a molecular weight of no more than 600 Dalton, as component C;

d) 1.00 to 30.00% by weight of at least one polymer having at least two (meth)acrylate groups and having a molecular weight of at least 700 Dalton, as component D;

e) 0 to 20.00% by weight of one or more photoinitiators, as component E;

f) 0 to 10.00% by weight of one or more colorants, as component F;

g) 0 to 2.00% by weight of one or more stabilizers, as component G;

h) 0 to 50.00% by weight of one or more further monomers, as component H;

j) 0 to 10.00% by weight of one or more further additives, as component J;

with the proviso that the amount of components A) plus B) is at least 50% by weight, based on the sum of components A to J, and that in all cases the amounts of components A to J add up to 100% by weight.

A particularly preferred compound of formula (I) is the compound of formula (Ia)

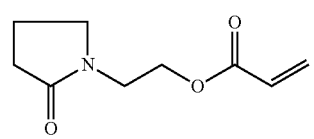

(Ia)

hereinafter referred to as PEA.

The compositions of the invention combine low viscosity, high reactivity, and good adhesion on the huge manifold of plastic substrates. Furthermore, the compositions of the invention do not require the presence of N-vinyl-pyrrolidone (NVP) and/or N-vinyl-caprolactam (NVC). The cured compositions have good mechanical and chemical resistance properties.

PEA is an excellent monofunctional monomer acrylate with an outstanding performance profile hardly found for any commercially available monofunctional monomer acrylate in UV inkjet. It combines very low viscosity as pure substance as well as in UV inkjet ink formulations with very high cure speed and very good adhesion on various substrates, such as plastic films. This well-balanced performance package is only matched by NVC known to be under severe pressure on the market due to its toxicity problems.

U.S. Pat. No. 5,629,359 and JP 2011-178863 generally disclose PEA as a compound of printing inks and varnishes.

Definitions

The expression "(meth)acrylate" stands for "acrylate or methacrylate". In one embodiment the (meth)acrylate is an acrylate. In another embodiment the (meth)acrylate is a methacrylate. Preferably, the (meth)acrylate is an acrylate.

The expression "(meth)acrylate group" stands for "acrylate group or methacrylate group". In one embodiment the (meth)acrylate group is an acrylate group (—O—C(O)—CH=$CH_2$). In another embodiment the (meth)acrylate group is a methacrylate group (—O—C(O)—C($CH_3$)=$CH_2$). Preferably, the (meth)acrylate group is an acrylate group.

Ethylene refers to —$CH_2$—$CH_2$—. Propylene refers to —$CH_2$—$CH_2$—$CH_2$—, —$CH_2$—$CH(CH_3)$—, or —$CH(CH_3)$—$CH_2$—. In a preferred embodiment propylene refers to —$CH_2$—$CH(CH_3)$— or —$CH(CH_3)$—$CH_2$—. In another embodiment propylene refers to —$CH_2$—$CH_2$—$CH_2$—. Butylene refers to linear or branched $C_4H_8$, preferably branched $C_4H_8$.

Ethyleneoxy refers to —O—$CH_2$—$CH_2$—. Propyleneoxy refers to —O—$CH_2$—$CH_2$—$CH_2$—, —O—$CH_2$—$CH(CH_3)$—, or —O—$CH(CH_3)$—$CH_2$—. In a preferred embodiment propyleneoxy refers to —O—$CH_2$—$CH(CH_3)$— or —O—$CH(CH_3)$—$CH_2$—. In another embodiment propyleneoxy refers to —O—$CH_2$—$CH_2$—$CH_2$—. Butyleneoxy refers to linear or branched $OC_4H_8$, preferably branched $OC_4H_8$. In cases where the molecular weight is distributed around an average value, the term "molecular weight" refers to the weight average molecular weight $M_w$ given in Dalton (if not specified otherwise).

Component A

The composition of the invention comprises, as component A, at least one, preferably one to three, more preferably one or two, even more preferably one, compound of formula (I),

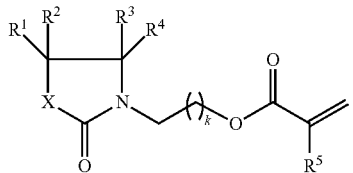

(I)

wherein
$R^1$, $R^2$, $R^3$, $R^4$ are each independently H, $C_1$-$C_6$-alkyl, $C_1$-$C_6$-alkoxy, or $C_1$-$C_6$-alkoxy-$C_1$-$C_6$-alkyl;
$R^5$ is H or $C_1$-$C_6$-alkyl;
X is $CR_6R_7$, O, or $NR^8$;
$R^6$, $R^7$ are each independently H, $C_1$-$C_6$-alkyl, $C_1$-$C_6$-alkoxy, or $C_1$-$C_6$-alkoxy-$C_1$-$C_6$-alkyl;
$R^8$ is H, $C_1$-$C_6$-alkyl, or $C_1$-$C_6$-alkoxy-$C_1$-$C_6$-alkyl;
k is 1, 2, 3, 4 or 5.

Preferred are compounds of formula (I) wherein $R^1$, $R^3$ are each independently H, $C_1$-$C_4$-alkyl, $C_1$-$C_4$-alkoxy, or $C_1$-$C_2$-alkoxy-$C_1$-$C_2$-alkyl.

Preferred are compounds of formula (I) wherein $R^2$, $R^4$ are each independently H, $C_1$-$C_4$-alkyl, or $C_1$-$C_2$-alkoxy-$C_1$-$C_2$-alkyl.

Preferred are compounds of formula (I) wherein $R^5$ is H or $C_1$-$C_4$-alkyl.

Preferred are compounds of formula (I) wherein X is $CR_6R_7$, O, or $NR^8$.

Preferred are compounds of formula (I) wherein $R^6$ is H, $C_1$-$C_4$-alkyl, $C_1$-$C_4$-alkoxy, or $C_1$-$C_2$-alkoxy-$C_1$-$C_2$-alkyl.

Preferred are compounds of formula (I) wherein $R^7$ is H, $C_1$-$C_4$-alkyl, or $C_1$-$C_2$-alkoxy-$C_1$-$C_2$-alkyl.

Preferred are compounds of formula (I) wherein $R^8$ is H or $C_1$-$C_4$-alkyl.

Preferred are compounds of formula (I) wherein k is 1, 2 or 3.

More preferred are compounds of formula (I) wherein $R^1$, $R^2$, $R^3$, $R^4$ are each independently H or $C_1$-$C_4$-alkyl.

More preferred are compounds of formula (I) wherein $R^5$ is H or $CH_3$.

More preferred are compounds of formula (I) wherein X is $CR_6R_7$ or O.

More preferred are compounds of formula (I) wherein $R^6$, $R^7$ are each independently H or $C_1$-$C_4$-alkyl.

More preferred are compounds of formula (I) wherein k is 1.

Even more preferred are compounds of formula (I) wherein $R^1$, $R^2$, $R^3$, $R^4$ are H.

Even more preferred are compounds of formula (I) wherein $R^5$ is H.

Even more preferred are compounds of formula (I) wherein X is $CH_2$ or O.

Even more preferred are compounds of formula (I) wherein k is 1.

Also preferred are compounds of formula (I) wherein all symbols and indices have the preferred meanings.

Also more preferred are compounds of formula (I) wherein all symbols and indices have the more preferred meanings.

Also even more preferred are compounds of formula (I) wherein all symbols and indices have the even more preferred meanings.

Preferred are compounds of formula (I) wherein
$R^1$, $R^3$ are each independently H, $C_1$-$C_4$-alkyl, $C_1$-$C_4$-alkoxy, or $C_1$-$C_2$-alkoxy-$C_1$-$C_2$-alkyl;
$R^2$, $R^4$ are each independently H, $C_1$-$C_4$-alkyl, or $C_1$-$C_2$-alkoxy-$C_1$-$C_2$-alkyl;
$R^5$ is H or $C_1$-$C_4$-alkyl;
X is $CR_6R_7$, O, or $NR^8$;
$R^6$ is H, $C_1$-$C_4$-alkyl, $C_1$-$C_4$-alkoxy, or $C_1$-$C_2$-alkoxy-$C_1$-$C_2$-alkyl;
$R^7$ is H, $C_1$-$C_4$-alkyl, or $C_1$-$C_2$-alkoxy-$C_1$-$C_2$-alkyl;
$R^8$ is H or $C_1$-$C_4$-alkyl;
k is 1, 2 or 3.

More preferred are compounds of formula (I) wherein
$R^1$, $R^2$, $R^3$, $R^4$ are each independently H or $C_1$-$C_4$-alkyl;
$R^5$ is H or $CH_3$;
X is $CR_6R_7$ or O;
$R^6$, $R^7$ are each independently H or $C_1$-$C_4$-alkyl;
k is 1.

Even more preferred are compounds of formula (I) wherein
$R^1$, $R^2$, $R^3$, $R^4$ are H;
$R^5$ is H;
X is $CH_2$ or O;
k is 1.

A particularly preferred compound of formula (I) is PEA (Ia)

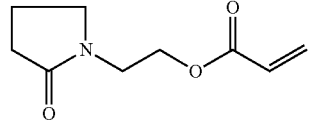

(Ia)

Another particularly preferred compound of formula (I) is a compound of formula (Ib):

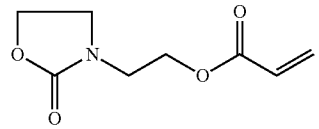

(Ib)

The compound of formula (Ib) is herein referred to as heonon acrylate.

The compounds of formula (I) can be prepared according to methods known in the art. For example, the compounds of formula (I) can be prepared by reacting a compound of formula (II),

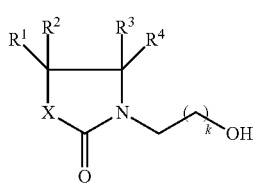

(II)

wherein $R^1$, $R^2$, $R^3$, $R^4$, X, and k are defined as in formula (I),
with a compound of formula (III),

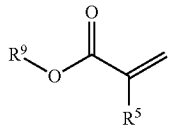

(III)

wherein $R^5$ is defined as in formula (I), and
$R^9$ is $C_1$-$C_6$-alkyl,
preferably in the presence of a catalyst.

Suitable catalysts for the reaction of the compound of formula (II) with the compound of formula (III) include Lewis acids, such as titanium tetraisopropoxide. The reaction of the compound of formula (II) with the compound of formula (III) can be carried out in the presence of further additives, such as stabilizers and/or inhibitors. Examples of further additives for the reaction of the compound of formula (II) with the compound of formula (III) include methylhydroquinone and/or phenothiazine.

Component B

The composition of the invention comprises, as component B, at least one monomer having two (meth)acrylate groups and having a molecular weight of no more than 500 Dalton.

In one embodiment the composition of the invention comprises, as component B, one to five, preferably one to four, more preferably one to three, also more preferably two to four, even more preferably two or three, particularly preferably two, also particularly preferably three monomer(s) having two (meth)acrylate groups and having a molecular weight of no more than 500 Dalton.

Preferred monomers having two (meth)acrylate groups (component B) have a molecular weight of no more than 500 Dalton, more preferably no more than 400 Dalton, even more preferably no more than 350 Dalton.

Preferred monomers having two (meth)acrylate groups (component B) have a molecular weight in the range of from 150 to 500 Dalton, more preferably from 150 to 400 Dalton, even more preferably from 150 to 350 Dalton.

In cases where the molecular weight is distributed around an average value, the term "molecular weight" refers to the weight average molecular weight $M_w$.

Preferred monomers having two (meth)acrylate groups (component B) have a dynamic viscosity at 23° C. in the range of from 3 to 400 mPas, more preferably from 3 to 150 mPas, even more preferably from 3 to 50 mPas. A typical shear rate is 100 $s^{-1}$. A typical method for determining viscosities is given in the experimental part of this application. This method can be applied in all cases in the context of the invention where dynamic viscosities are determined.

In a further preferred embodiment the at least one monomer having two (meth)acrylate groups of component B has a molecular weight in the range of 150 to 400 Dalton and a dynamic viscosity at 23° C. in the range of from 3 to 150 mPas.

Preferred monomers having two (meth)acrylate groups (component B) also have at least one group Y which is selected from —O—$CH_2$—$CH_2$—, —O—$CH_2$—$CH_2$—$CH_2$—, —O—$CH_2$—$CH(CH_3)$—, and —O—$CH(CH_3)$—$CH_2$— and which is attached to at least one of the (meth)acrylate groups. Said group Y is attached via a carbon atom to an oxygen atom of said (meth)acrylate group.

Preferred monomers having two (meth)acrylate groups (component B) are di(meth)acrylates of alkoxylated diols.

Preferably, the alkoxylated diol is selected from ethoxylated, propoxylated, and butoxylated diols. More preferably, the alkoxylated diol is selected from ethoxylated and propoxylated diols.

Even more preferably, the alkoxylated diol is an ethoxylated diol. Also even more preferably, the alkoxylated diol is a propoxylated diol.

Preferred di(meth)acrylates of alkoxylated diols have an average of 1 to 20, more preferably 2 to 15, even more preferably 2 to 10 alkyleneoxy groups per molecule. Preferably, the alkyleneoxy groups are selected from ethyleneoxy, propyleneoxy, and butyleneoxy groups. More preferably, the alkyleneoxy groups are selected from ethyleneoxy and propyleneoxy groups. Even more preferably, the alkyleneoxy groups are selected from —O—$CH_2$—$CH_2$—, —O—$CH_2$—$CH(CH_3)$—, and —O—$CH(CH_3)$—$CH_2$— groups. Particularly preferably, the alkyleneoxy groups are —O—$CH_2$—$CH_2$— groups. Also particularly preferably, the alkyleneoxy groups are selected from —O—$CH_2$—$CH(CH_3)$— and —O—$CH(CH_3)$—$CH_2$— groups.

Preferred diols are ethylene glycol, diethylene glycol, triethylene glycol, propylene glycol, dipropylene glycol, tripropylene glycol, 1,3-propanediol, 1,4-butanediol, 1,5-pentanediol, neopentyl glycol, 1,6-hexanediol, 2,2-diethyl-1,3-propanediol and 3-methyl-1,5-pentanediol.

More preferred diols are neopentyl glycol, dipropylene glycol, tripropylene glycol and 3-methyl-1,5-pentanediol.

Preferred monomers having two (meth)acrylate groups (component B) are monomers of formula (B-1),

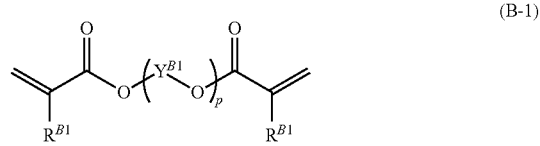

(B-1)

wherein
each $R^{B1}$ is independently H or $CH_3$;
each $Y^{B1}$ is independently ethylene, propylene, or butylene;
p is a number from 1 to 15.

Preferred are monomers of formula (B-1) wherein
each $R^{B1}$ is independently H or $CH_3$;
each $Y^{B1}$ is independently ethylene or propylene;
p is a number from 1.5 to 10.

More preferred are monomers of formula (B-1) wherein
each $R^{B1}$ is independently H or $CH_3$;

each $Y^{B1}$ is independently —$CH_2$—$CH_2$—, —$CH_2$—$CH(CH_3)$—, or —$CH(CH_3)$—$CH_2$—;
p is a number from 1.8 to 2.4.

Even more preferred are monomers of formula (B-1) wherein
each $R^{B1}$ is H;
each $Y^{B1}$ is independently —$CH_2$—$CH(CH_3)$— or —$CH(CH_3)$—$CH_2$—;
p is 2.

A particularly preferred compound having two (meth)acrylate groups (component B) is dipropyleneglycol diacrylate, which is commercially available as Laromer® DPGDA from BASF.

The compounds of formula (B-1) can be prepared according to methods known in the art. For example, the compounds of formula (B-1) can be prepared by reacting a diol of the formula HO($Y^{B1}$O)$_p$H with, e.g., (meth)acrylic acid or an alkyl (meth)acrylate, optionally in the presence of a catalyst.

Further preferred monomers having two (meth)acrylate groups (component B) are monomers of formula (B-2),

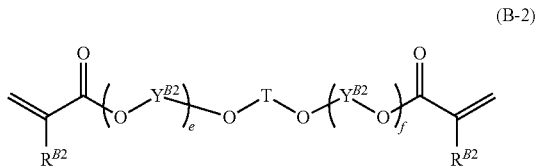

(B-2)

wherein
T is $C_1$-$C_{10}$-alkylene;
each $R^{B2}$ is independently H or $CH_3$;
each $Y^{B2}$ is independently ethylene, propylene, or butylene;
e and f are numbers, with the proviso that e+f is a number from 1 to 10.

Preferred are monomers of formula (B-2) wherein
T is $C_3$-$C_{58}$-alkylene;
each $R^{B2}$ is independently H or $CH_3$;
each $Y^{B2}$ is independently ethylene or propylene;
e and f are numbers, with the proviso that e+f is a number from 1.5 to 5.

More preferred are monomers of formula (B-2) wherein
T is $C_4$-$C_6$-alkylene;
each $R^{B2}$ is independently H or $CH_3$;
each $Y^{B2}$ is independently —$CH_2$—$CH_2$—, —$CH_2$—$CH(CH_3)$—, or —$CH(CH_3)$—$CH_2$—;
e and f are numbers, with the proviso that e+f is a number from 1.8 to 2.4.

Even more preferred are monomers of formula (B-2) wherein
T is —$CH_2$—$C(CH_3)_2$—$CH_2$—;
each $R^{B2}$ is H;
each $Y^{B2}$ is independently —$CH_2$—$CH(CH_3)$— or —$CH(CH_3)$—$CH_2$—;
e and f are numbers, with the proviso that e+f is 2.

A particularly preferred monomer having two (meth)acrylate groups (component B) is a propoxylated neopentyl glycol diacrylate having an average of 2 propyleneoxy groups per molecule, i.e. propoxylated (2.0) neopentyl glycol diacrylate:

($CH_2$=CH—COO—$CH(CH_3)$—$CH_2$—O—$CH_2$-)$_2$C($CH_3$)$_2$, which is commercially available as Laromer® PO 9102 from BASF.

In a further preferred embodiment component B is selected from the group consisting of monomers of formula (B-1) and monomers of formula (B-2).

The monomers of formula (B-2) can be prepared according to methods known in the art. For example, the monomers of formula (B-2) can be prepared by reacting a diol of the formula H(O$Y^{B2}$)$_e$OTO($Y^{B2}$O)$_f$H with, e.g., (meth)acrylic acid or an alkyl (meth)acrylate, optionally in the presence of a catalyst.

Component C

Optionally, the composition of the invention comprises, as component C, at least one monomer having at least three (meth)acrylate groups and having a molecular weight of no more than 600 Dalton.

In one embodiment the composition of the invention comprises, as component C, one to four, preferably one to three, more preferably one or two, even more preferably one, also even more preferably two monomer(s) having at least three (meth)acrylate groups and having a molecular weight of no more than 600 Dalton.

Preferred monomers having at least three (meth)acrylate groups (component C) are monomers having three to eight (meth)acrylate groups. More preferred are monomers having three to six (meth)acrylate groups. Even more preferred are monomers having three or four (meth)acrylate groups. Particularly preferred are monomers having three (meth)acrylate groups. Also particularly preferred are monomers having four (meth)acrylate groups.

Preferred monomers having at least three (meth)acrylate groups (component C) have a molecular weight of at most 600 g/mol, more preferably at most 550 Dalton, even more preferably at most 500 Dalton.

Preferred monomers having at least three (meth)acrylate groups (component C) have a molecular weight in the range of from 200 to 600 Dalton, more preferably from 200 to 550 Dalton, even more preferably from 200 to 500 Dalton.

In cases where the molecular weight is distributed around an average value, the term "molecular weight" refers to the weight average molecular weight $M_w$.

Preferred monomers having at least three (meth)acrylate groups (component C) have a dynamic viscosity at 23° C. in the range of from 10 to 400 mPas, more preferably from 10 to 200 mPas, even more preferably from 10 to 100 mPas.

In a further preferred embodiment, the at least one monomer having at least three (meth)acrylate groups of component C has a molecular weight in the range of 200 to 550 Dalton and a dynamic viscosity at 23° C. in the range of from 10 to 200 mPas.

Preferred monomers having at least three (meth)acrylate groups (component C) also have at least one group Y which is selected from —O—$CH_2$—$CH_2$—, —O—$CH_2$—$CH_2$—$CH_2$—, —O—$CH_2$—$CH(CH_3)$—, and —O—$CH(CH_3)$—$CH_2$— and which is attached to at least one of the (meth)acrylate groups. Said group Y is attached via a carbon atom to an oxygen atom of said (meth)acrylate group.

Preferred monomers having at least three (meth)acrylate groups (component C) are (meth)acrylates of alkoxylated polyhydric alcohols.

Preferably, the alkoxylated polyhydric alcohol is selected from ethoxylated, propoxylated, and butoxylated polyhydric alcohols. More preferably, the alkoxylated polyhydric alcohol is selected from ethoxylated and propoxylated polyhydric alcohols. Even more preferably, the alkoxylated polyhydric alcohol is an ethoxylated polyhydric alcohol. Also even more preferably, the alkoxylated polyhydric alcohol is a propoxylated polyhydric alcohol.

Preferred (meth)acrylates of alkoxylated polyhydric alcohols have an average of 3 to 20, more preferably 3 to 15, even more preferably 3 to 10 alkyleneoxy groups per molecule. Preferably, the alkyleneoxy groups are selected from ethyleneoxy, propyleneoxy, and butyleneoxy groups.

More preferably, the alkyleneoxy groups are selected from ethyleneoxy and propyleneoxy groups. Even more preferably, the alkyleneoxy groups are selected from —O—CH$_2$—CH$_2$—, —O—CH$_2$—CH(CH$_3$)—, and —O—CH(CH$_3$)—CH$_2$— groups. Particularly preferably, the alkyleneoxy groups are —O—CH$_2$—CH$_2$— groups. Also particularly preferably, the alkyleneoxy groups are selected from —O—CH$_2$—CH(CH$_3$)— and —O—CH(CH$_3$)—CH$_2$— groups.

Preferably, the polyhydric alcohol is selected from triols, tetraols, pentaols, and hexaols. More preferably, the polyhydric alcohol is selected from triols and tetraols. Even more preferably, the polyhydric alcohol is a triol. Also even more preferably, the polyhydric alcohol is a tetraol.

Preferred triols are trimethylolmethane, trimethylolethane, trimethylolpropane, glycerol.

More preferred triols are trimethylolpropane and glycerol.

Preferred tetraols are pentaerythritol and di(trimethylolpropane)

More preferred tetraols are pentaerythritol

A particularly preferred tetraol is pentaerythritol.

Preferred hexanols are dipentaerythritol

Preferably, the number of (meth)acrylate groups in the molecule corresponds to the number of hydroxy groups in the polyhydric alcohol which the molecule is based on. For example, when the polyhydric alcohol is a triol, the number of (meth)acrylate groups preferably is three. When the polyhydric alcohol is a tetraol, the number of (meth)acrylate groups preferably is four. When the polyhydric alcohol is a pentaol, the number of (meth)acrylate groups preferably is five. When the polyhydric alcohol is a hexaol, the number of (meth)acrylate groups preferably is six.

Preferred (meth)acrylates of alkoxylated polyhydric alcohols are selected from tri(meth)acrylates of alkoxylated triols, tetra(meth)acrylates of alkoxylated tetraols, penta(meth)acrylates of alkoxylated pentaols, and hexa(meth)acrylates of alkoxylated hexaols. More preferred (meth)acrylates of alkoxylated polyhydric alcohols are selected from tri(meth)acrylates of alkoxylated triols and tetra(meth)acrylates of alkoxylated tetraols. Even more preferred are tri(meth)acrylates of alkoxylated triols. Also even more preferred are tetra(meth)acrylates of alkoxylated tetraols.

Preferred monomers having at least three (meth)acrylate groups (component C) are compounds of formula (C-1),

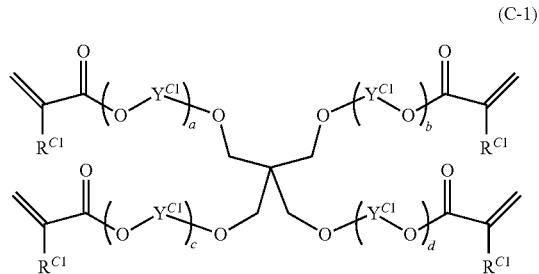

(C-1)

wherein
each R$^{C1}$ is independently H or CH$_3$;
each Y$^{C1}$ is independently ethylene, propylene, or butylene;
a, b, c, and d are numbers, with the proviso that a+b+c+d is a number from 1 to 15.

Preferred are monomers of formula (C-1) wherein
each R$^{C1}$ is independently H or CH$_3$;
each Y$^{C1}$ is independently ethylene or propylene;
a, b, c, and d are numbers, with the proviso that a+b+c+d is a number from 2 to 10.

More preferred are monomers of formula (C-1) wherein
each R$^{C1}$ is independently H or CH$_3$;
each Y$^{C1}$ is independently —CH$_2$—CH$_2$—, —CH$_2$—CH(CH$_3$)—, or —CH(CH$_3$)—CH$_2$—;
a, b, c, and d are numbers, with the proviso that a+b+c+d is a number from 3 to 8.

Even more preferred are monomers of formula (C-1) wherein
each R$^{C1}$ is H;
each Y$^{C1}$ is —CH$_2$—CH$_2$—;
a, b, c, and d are numbers, with the proviso that a+b+c+d is a number from 4 to 6.

A particularly preferred monomer having at least three (meth)acrylate groups (component C) is an ethoxylated pentaerythritol tetraacrylate having an average of 5 ethyleneoxy groups per molecule. An "ethoxylated pentaerythritol tetraacrylate having an average of 5 ethyleneoxy groups per molecule" is a tetraacrylate of ethoxylated pentaerythritol which has an average of 5 ethyleneoxy groups per molecule (ethoxylated (5.0) pentaerythrol tetraacrylate), which is commercially available as Laromer® PPTTA from BASF.

The compounds of formula (C-1) can be prepared according to methods known in the art. For example, the compounds of formula (C-1) can be prepared by reacting the corresponding alkoxylated (e.g., ethoxylated, propoxylated, or butoxylated) pentaerythritol with, e.g., (meth)acrylic acid or an alkyl (meth)acrylate, optionally in the presence of a catalyst.

Component D

The composition of the invention comprises, as component D, at least one polymer having at least two (meth)acrylate groups and having a molecular weight of at least 700 Dalton.

Preferred polymers (component D) have a molecular weight of at least 700 Dalton, more preferably at least 1000 Dalton, even more preferably at least 1500 Dalton.

Preferred polymers (component D) have a molecular weight in the range of from 700 to 2000 Dalton. In cases where the molecular weight is distributed around an average value, the term "molecular weight" refers to the weight average molecular weight M$_w$.

Preferred polymers (component D) have a dynamic viscosity at 23° C. in the range of from 100 to 5000 mPas, more preferably from 100 to 2500 mPas, even more preferably from 100 to 1000 mPas.

In a further preferred embodiment the at least one polymer having at least two (meth)acrylate groups of component D has a molecular weight in the range of 1000 to 2000 Dalton and a dynamic viscosity at 23° C. in the range of from 100 to 2500 mPas.

Suitable polymers as component D show low to medium viscosity, good film forming properties and good adhesion on paper, plastics and other substrates. Such polymers are known to those skilled in the art and are commercially available.

Preferred as component D are:
a) amine modified polyether acrylates, which are commercially available under various tradenames, such as Laromer® PO 94 F (BASF SE, viscosity at 23.0° C., 300-600 mPas),
Laromer® PO 9103 (BASF SE, viscosity at 23.0° C., 2500-4000 mPas),
Laromer® PO 9106 (BASF SE, viscosity at 23.0° C., 2500-3500 mPas),
Laromer® LR 8997 (BASF SE, viscosity at 23.0° C., 300-500 mPas);

b) polyether acrylates (not amine modified), which are commercially available under various tradenames such as SR415 (Sartomer, ethoxylated (20) trimethylolpropane triacrylate, viscosity at 25° C., 150-300 mPas), SR 9035 (Sartomer, ethoxylated (15) trimethylolpropane triacrylate, viscosity at 25° C., 100-240 mPas);

c) polyesteracrylates, which are available under various tradenames such as Laromer® PE 9105 (BASF SE, tetrafunctional polyester acrylate, viscosity at 23° C., 150-400 mPas),
Genomer® 3485 (Rahn AG, polyester acrylate, viscocity at 25° C., 500 mPas),
CN 2305 (Sartomer, hyperbranched polyester acrylate, viscosity at 25° C., 250-400 mPas),
CN 2505 (Sartomer, polyester acrylate, viscosity at 25° C., 400-1000 mPas);

d) urethane acrylates, which are available under various tradenames such as
CN 925 (Sartomer, viscosity at 25° C., 2500 mPas),
CN 9251 (Sartomer, viscosity at 20° C., 450 mPas).

In a preferred embodiment the polymer (component D) also has amino groups.

In one preferred embodiment the polymer (component D) is an amine-modified polyether acrylate. Suitable amine-modified polyether acrylates are known to a person skilled in the art.

In a further preferred embodiment the polymer (component D) is an amine-modified (meth)acrylate of an alkoxylated polyhydric alcohol. Suitable amine-modified (meth)acrylates of alkoxylated polyhydric alcohols are known to a person skilled in the art.

Component E (Photoinitiator)

Optionally, the composition of the invention comprises, as component E, one or more, preferably one to five, more preferably one to four, even more preferably two to four photoinitiators. Suitable photoinitiators are known to a person skilled in the art.

Examples of suitable photoinitiators include alpha-hydroxyketones, alpha-aminoketones, acylphosphine oxides, benzoin and benzoin derivatives, and benzil derivatives, acetophenone and acetophenone derivatives, benzophenone, and benzophenone derivatives, thioxanthone and thioxanthone derivatives.

Examples of preferred photoinitiators include alpha-hydroxyketones and acylphosphine oxides. Examples of particularly preferred photoinitiators include 2-hydroxy-1-{4-[4-(2-hydroxy-2-methylpropionyl)-benzyl]-phenyl}-2-methyl-propan-1-one, bis(2,4,6-trimethylbenzoyl) phenylphosphine oxide, or diphenyl(2,4,6-trimethylbenzoyl)phosphine oxide.

In a particularly preferred embodiment the composition of the invention comprises, as photoinitiators, Irgacure® 127, Irgacure® 819, and/or Irgacure® TPO, which are commercially available from IGM Resins.

Further to the photoinitiator component E may comprise up to 50% by weight (based on the total of component E) of one or more synergists. Examples of synergists are aliphatic tertiary amines like triethylamine, triethanolamine or N-methyldiethanolamine and aromatic amines like esters of 4-dimethylaminobenzoic acid.

Compositions of the invention that do not comprise a photoinitiator can be used, e.g., in electron beam curing process.

Component F (Colorant)

Optionally, the composition of the invention comprises, as component F, one or more, preferably one to five, more preferably one to four, even more preferably one to three colorants. Suitable colorants are known to a person skilled in the art. Preferred colorants are pigments and dyes. More preferred colorants are pigments.

Examples of suitable dyes include azo dyes, anthraquinone dyes, xanthene dyes, or azine dyes.

Examples of suitable pigments include phthalocyanine pigments, quinacridone pigments, benzimidazolone pigments, carbon black and titanium dioxides.

Examples of preferred pigments include phthalocyanine pigments, quinacridone pigments, benzimidazolone pigments and carbon black.

In a particularly preferred embodiment the composition of the invention comprises, as a colorant/pigment, Microlith® Blue 7080 J, Microlith® Magenta 4500 J, Microlith® Yellow 1061 J, or Microlith® Black 0066 J, which are commercially available.

Microlith® Blue 7080 J is a pigment preparation which contains a phthalocyanine pigment (about 70% by weight) predispersed in an acrylic copolymer binder. Microlith® Magenta 4500 J is a pigment preparation which contains a quinacridone pigment (about 70% by weight) predispersed in an acrylic copolymer binder. Microlith® Yellow 1061 J is a pigment preparation which contains a benzimidazolone pigment (about 70% by weight) predispersed in an acrylic copolymer binder. Microlith® Black 0066 J is a pigment preparation which contains carbon black (about 65% by weight) predispersed in an acrylic copolymer binder.

Compositions of the invention that do not comprise a colorant can be used, e.g., as overprint varnishes.

Component G (Stabilizer)

Optionally, the composition of the invention comprises, as component G, one or more, preferably one to five, more preferably one to four, even more preferably one to three in-can stabilizers. Suitable in-can stabilizers are known to a person skilled in the art.

In one preferred embodiment, the stabilizers are in-can stabilizers.

By the term "in-can stabilizer" is meant a stabilizer that improves the long term storage stability.

Examples of suitable stabilizers include nitroxyl compounds, such as 1-oxyl-2,2,6,6-tetramethylpiperidine or 4-hydroxy-1-oxyl-2,2,6,6-tetramethylpiperidine, phenol derivatives, such as 2,6-ditert-butyl-4-methylphenol, tocopherols, quinones, benzoquinones, quinone methide derivatives, such as 4-benzylidene-2,6-ditert-butyl-cyclohexa-2,5-dien-1-one, hydroquinones, such as hydroquinone monomethyl ether, N-oxyl compounds, aromatic amines, phenylenediamines, imines, sulfonamides, oximes, hydroxylamines, urea derivatives, phosphorus-containing compounds, such as triphenylphosphine, triphenylphosphite, hypophosphorous acid, trinonyl phosphite, triethyl phosphite or diphenylisopropylphosphine, sulfur-containing compounds, such as phenothiazine, tetraazaannulene derivatives.

Examples of particularly preferred stabilizers are methylhydroquinone or phenothiazine. Another example of a particularly preferred stabilizer is 4-benzylidene-2,6-ditert-butyl-cyclohexa-2,5-dien-1-one.

In a particularly preferred embodiment the composition of the invention comprises, as a stabilizer, Irgastab® UV 25, which is commercially available from BASF.

The presence of one or more stabilizers will greatly improve the storage and/or transport stability of the composition.

Component H (Further Monomers)

Optionally, the composition of the invention comprises, as component H, one or more further monomers. Preferably, the further monomers (component H) are different from components A to C. Suitable further monomers are known to a person skilled in the art.

Examples of further monomers (component H) include

N-vinyl compounds, such as
- N-vinyl-pyrrolidone (NVP),
- N-vinyl-caprolactam (NVC),
- N-vinyl-imidazole,
- N-vinyl-N-methylacetamide (VIMA), O-vinyl compounds, such as
- ethyl vinyl ether,
- n-butyl vinyl ether,
- iso-butyl vinyl ether,
- tert.-butyl vinyl ether,
- cyclohexyl vinyl ether (CHVE),
- 2-ethylhexyl vinyl ether (EHVE),
- dodecyl vinyl ether (DDVE),
- octadecyl vinyl ether (ODVE), divinyl compounds, such as
- 1,4-butanediol divinyl ether (BDDVE),
- diethyleneglycol divinyl ether (DVE-2),
- triethyleneglycol divinyl ether (DVE-3),
- 1,4-cyclohexanedimethanol divinyl ether (CHDM-di), hydroxy vinyl compounds, such as
- hydroxybutyl vinyl ether (HBVE),
- 1,4-cyclohexanedimethanol mono vinyl ether (CHDM-mono), other vinyl compounds, such as
- 1,2,4-trivinylcyclohexane (TVCH), mixed acrylate/vinylether compounds, such as
- 2-(2-vinyloxyethoxy)ethyl acrylate (VEEA)
- 2-(2-vinyloxyethoxy)ethyl methacrylate (VEEM).

Component J (Further Additives)

Optionally, the composition of the invention comprises, as component J, one or more further additives. The further additives (component J) are different from components A to H.

Examples of further additives (component J) include dispersants, fillers, rheological aids, slip agents, leveling agents, substrate wetting agents, antifoaming agents, antistatic agents and antioxidants.

Suitable further additives are known to a person skilled in the art.

Preferred as one class of further additives (component J) are dispersants.

Suitable dispersants are known to those skilled in the art. Preferred as dispersants are high molecular weight modified polyacrylates, such as Efka® PA 4400 (BASF) and Efka® PX 4733 (BASF), and high molecular weight acrylic block copolymers, such as Efka® PX 4701 (BASF) and Efka® PX 4320.

In one embodiment an organically modified polysiloxane is used as a further additive, for example as a slip, leveling, and/or substrate wetting agent. In another embodiment Efka® SL 3210, which is commercially available from BASF, is used as a further additive, for example as a slip, leveling, and/or substrate wetting agent.

Composition

The composition of the invention comprises, and preferably consists of, (all percentages are by weight):

a) from 1.00%, preferably 3.00%, more preferably 3.00%, in particular 5.00% to 65.00%, preferably 50%, more preferably 40.00%, in particular 30.00% of component A;

b) from 1.00%, preferably 5.00%, more preferably 10.00%, in particular 20% to 60%, preferably 55%, more preferably 40.00%, in particular 35.00% of component B;

c) from 0.00%, preferably 0.50%, more preferably 3.00%, in particular 5.00% to 25.00%, preferably 22.50%, more preferably 20.00%, in particular 15% of component C, wherein in one embodiment, the amount of component C is 0.00%, and wherein in another embodiment, the amount of component C is at least 0.50%;

d) from 1.00%, preferably 3.00%, more preferably 5.00%, in particular 7.50% to 30.00%, preferably 25.00%, more preferably 20.00%, in particular 15.00% of component D;

e) from 0.00%, preferably 3.00%, more preferably 5.00%, in particular 7.50% to 20.00%, preferably 15.00%, more preferably 12.00%, in particular 10.00% of component E, wherein in one embodiment, the amount of component E is 0.00%, and wherein in another embodiment, the amount of component E is at least 3.00%;

f) from 0.00%, preferably 0.10%, more preferably 0.50%, in particular 1.00% to 10.00%, preferably 7.50%, more preferably 7.25%, in particular 5.00% of component F, wherein in one embodiment, the amount of component F is 0.00%, and wherein in another embodiment, the amount of component F is at least 0.10%;

g) from 0.00%, preferably 0.01%, more preferably 0.02%, in particular 0.05% to 2.00%, preferably 1.50%, more preferably 0.75%, in particular 0.50% of component G, wherein in one embodiment, the amount of component G is 0.00%, and wherein in another embodiment, the amount of component G is at least 0.01%;

h) from 0.00%, preferably 1.00%, more preferably 5.00%, in particular 10% to 50%, preferably 40.00%, more preferably 30%, in particular 25% of component H, wherein in one embodiment, the amount of component H is 0.00%, and wherein in another embodiment, the amount of component H is at least 1.00%, and i) from 0.00%, preferably 0.10%, more preferably 0.20%, in particular 0.25% to 10%, preferably 7.50%, more preferably 5.00%, in particular 3.00% of component J, wherein in one embodiment, the amount of component J is 0.00%, and wherein in another embodiment, the amount of component J is at least 0.10%, wherein in all cases, the amount of components A+B is at least 50, and the amounts of components A to J add up to 100%.

In a further preferred embodiment the composition comprises and preferably consists of a) from 3.00% by weight to 50% by weight of component A;
b) from 5.00% by weight to 55% by weight of component B;
c) from 0.50% by weight to 22.50% by weight of component C;
d) from 3.00% by weight to 25.00% by weight of component D;
e) from 3.00% by weight to 15.00% by weight of component E;
f) from 0.10% by weight to 7.50% by weight of component F;
g) from 0.01% by weight to 1.50% by weight of component G;

h) from 0.00% by weight or from 1.00% by weight to 40.00% by weight of component H;
i) from 0.10% by weight to 7.50% by weight of component J;

wherein in all cases, the amount of components A+B is at least 50% by weight, and the amounts of components A to J add up to 100% by weight.

The composition of the invention preferably has a water content of less than 2.00% by weight, more preferred less than 0.50% by weight, even more preferred less than 0.10% by weight. A typical water content due to traces of water in the various components is from 0.10 to 0.40% by weight.

The composition of the invention preferably comprises less than 2.00% by weight, more preferred less than 0.50% by weight, even more preferred less than 0.10% by weight of one or more inert organic solvents. A typical content of inert organic solvents due to traces from the synthesis of the various components is from 0.10 to 0.04% by weight.

In one embodiment the composition of the invention is free of N-vinyl-pyrrolidone (NVP), which means that the composition comprises less than 1.00% by weight, more preferably less than 0.50% by weight, even more preferably less than 0.10% by weight, particularly preferably less than 0.01% by weight of N-vinyl-pyrrolidone (NVP), based on the total weight of the composition.

In one embodiment the composition of the invention is free of N-vinyl-caprolactam (NVC), which means that the composition comprises less than 1.00% by weight, more preferably less than 0.50% by weight, even more preferably less than 0.10% by weight, particularly preferably less than 0.01% by weight of N-vinyl-caprolactam (NVC), based on the total weight of the composition.

In one embodiment the composition of the invention is free of N-vinyl-pyrrolidone (NVP) and free of N-vinyl-caprolactam (NVC).

In a preferred embodiment the composition of the invention is a printing ink.

In a particularly preferred embodiment the composition of the invention is an inkjet printing ink. Preferably, the composition of the invention has a viscosity (dynamic viscosity, 25° C., shear rate 100 s$^{-1}$) in the range of from 5 to 100 mPas, more preferably from 15 to 60 mPas, even more preferably from 20 to 50 mPas, particularly preferably from 25 to 45 mPas.

The composition of the invention can be prepared by methods known in the art. For example, the composition of the invention can be prepared by adding and mixing the components of the composition in any order.

Further Objects of the Invention

In a further aspect of the invention there is provided the use of a composition of the invention as a printing ink. Preferably, the composition is used as an inkjet printing ink. Accordingly, in a further aspect of the invention there is provided the use of a composition of the invention as an inkjet printing ink.

In a further aspect of the invention there is provided a method for printing, preferably inkjet printing, comprising the steps of:
a) applying a composition of the invention onto a substrate;
b) curing the composition.

Preferred printing techniques are inkjet printing, flexographic printing (flexo printing, flexography), gravure printing, screen printing, lithographic printing (litho printing, lithography), offset printing, or letterpress printing.

A particularly preferred printing technique is inkjet printing.

Various inkjet printers can be used. Examples of suitable inkjet printers include single-pass and multi-pass inkjet printers.

The composition of the invention can be applied onto various substrates. Preferred substrates are paper, carton, cardboard, corrugated board, glass, plastic films, or metallized films. More preferred substrates are plastic films.

Examples of plastic films are polyethylene terephthalate films, polyamide films, polystyrene films, polyvinylchloride films, polycarbonate films, or polyolefin (e.g., polyethylene or polypropylene) films. Examples of more preferred plastic films are polyethylene terephthalate films, polystyrene films, polyvinylchloride films, polyethylene films, or polypropylene films.

The substrates, for example the plastic films, can be pretreated, for example, corona-pretreated.

The composition of the invention can be cured by methods known in the art. Preferably, the composition of the invention is cured by exposure to actinic radiation. The actinic radiation is preferably UV radiation and preferably has a wavelength in the range of from 200 to 500 nm, more preferably from 250 to 450 nm.

Various radiation sources can be used to cure the composition of the invention. Examples of suitable radiation sources include halogen lamps, medium pressure mercury lamps, low pressure mercury lamps, UV LEDs, excimer lamps, or lasers. In one embodiment a medium pressure mercury/gallium lamp is used to cure the composition of the invention.

In one embodiment the composition of the invention is cured by electron beam.

Preferably, the composition of the invention is cured at a temperature under air in the range of from 15 to 40° C., more preferably from 20 to 40° C., even more preferably from 20 to 35° C.

The composition of the invention can be cured in an inert atmosphere, such as a nitrogen atmosphere or a carbon dioxide atmosphere.

The invention is illustrated by the following examples without being limited thereby.

EXAMPLES

1 Materials
1.1 Chemicals
  Monofunctional monomer acrylate 2-(2-oxopyrrolidin-1-yl)ethyl acrylate from BASF SE (PEA)
  Monofunctional monomer acrylate Laromer® POEA (2-phenoxyethyl acrylate) from BASF SE (POEA).
  Monofunctional monomer acrylate 2-(2-oxooxazolidin-3-yl)ethyl acrylate from BASF SE (HEA).
  Monofunctional monomer vinyl amide N-vinyl-5-methyl-oxazolidinone from BASF SE (VIMOX).
  Monofunctional monomer vinyl amide N-vinyl-caprolactam from BASF SE (NVC).
  Monofunctional monomer acryl amide ACMO (4-(1-oxo-2-propenyl)morpholine) from Rahn AG (ACMO).
  Difunctional monomer acrylate Laromer® DPGDA (dipropylene glycol diacrylate) from BASF SE (DPGDA); molecular weight: 242 g/mol.
  Difunctional monomer acrylate Laromer® PO 9102 (propoxylated (2.0) neopentylglycol diacrylate) from BASF SE (PONPGDA).
  Difunctional monomer acrylate Laromer® HDDA (1,6-hexanediol diacrylate) from BASF SE (HDDA).

Tetrafunctional monomer acrylate Laromer® PPTTA (ethoxylated (5.0) pentaerythritol tetraacrylate) from BASF SE (PPTTA); molecular weight: 572 g/mol (calculated).
Polymeric tetrafunctional polyester acrylate Laromer® PE 9105 from BASF SE.
Photoinitiator Irgacure® 127 from IGM Resins.
Photoinitiator Irgacure® 819 from IGM Resins.
Photoinitiator Irgacure® TPO from IGM Resins.
Substrate wetting agent EFKA® SL 3210 from BASF SE.
In-can stabilizer Irgastab® UV 25 from BASF SE.
Pigment preparation Microlith® Blue 7080 J (70% pigment) from BASF SE (colour index:Pigment Blue 15:3).
Pigment preparation Microlith® Black 0066 J (65% pigment) from BASF SE (colour index:Pigment Black 7).
deionized water.
MeHQ: monomethyl ether of hydroquinone or hydroquinone monomethyl ether, also known as 4-methoxyphenol or 4-hydroxyanisole.
Hydroxy ethyl pyrrolidin-2-one, which is used in preparation example 1 given below, refers to the following compound:

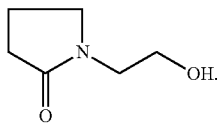

Heonon, which is used in preparation example 2 given below, refers to the following compound:

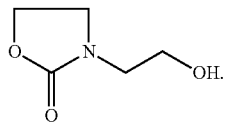

Laromer® PPTTA: an ethoxylated pentaerythritol tetraacrylate having an average of 5 ethyleneoxy groups per molecule.
Laromer® DPGDA: dipropyleneglycol diacrylate.
Irgastab® UV 25: 4-benzylidene-2,6-ditert-butyl-cyclohexa-2,5-dien-1-one (14% by weight) in Laromer® POEA.
Irgacure® 127: 2-hydroxy-1-{4-[4-(2-hydroxy-2-methyl-propionyl)-benzyl]-phenyl}-2-methylpropan-1-one.
Irgacure® 819: bis(2,4,6-trimethylbenzoyl)phenylphosphine oxide.
Irgacure® TPO: diphenyl(2,4,6-trimethylbenzoyl)phosphine oxide.
Efka® SL 3210: an organically modified polysiloxane.
PC Cyan: a pigment concentrate which comprises Microlith® Blue 7080 J (12% by weight, based on the pigment concentrate), Laromer® POEA (48% by weight, based on the pigment concentrate), and Laromer® PO 9102 (40% by weight, based on the pigment concentrate).
PC Black: a pigment concentrate which comprises Microlith® Black 0066 J (14% by weight, based on the pigment concentrate), Laromer® POEA (46% by weight, based on the pigment concentrate), and Laromer® PO 9102 (40% by weight, based on the pigment concentrate).
Laromer® PO 9102: a propoxylated neopentyl glycol diacrylate having an average of 2 propyleneoxy groups per molecule.

1.2 Substrates

Chemically treated Melinex® 506 clear polyester (PET) film with a thickness of 175 µm from DuPont Teijin Films
Corona treated Bicor® MB400 clear biaxially oriented polypropylene (boPP) film with a thickness of 30 µm from Jindal Films
Corona treated clear low density polyethylene (LDPE) film with a thickness of 50 µm from Hapece 2 Equipment Conveyor belt driven UV dryer equipped with a medium pressure mercury/gallium lamp having a maximum electrical input power of 200 W/cm from IST METZ
K Control Coater model 101 with variable speed and equipped with a 12 µm spiral bar coater from RK PrintCoat Instruments
Dispermill® Yellowline 2075 dissolver from ATP Engineering
Physica® MCR 301 rheometer with cone-plate geometry from Anton Paar
Micro-gloss 60° glossmeter from BYK Gardner
Radiometer UV Integrator 140 from Kihnast
500 Series Spectrodensitometer from X-Rite 3 Measurement Methods Viscosity:
Viscosity was measured at 23.0° C. for different shear rates with ramping up the shear rate from 10 sec$^{-1}$ over 100 sec$^{-1}$ to 1000 sec$^{-1}$.

Gloss:
Gloss was evaluated at an angle of 60° in dimensionless gloss units for 12 µm drawdowns on Melinex® 506. The corresponding drawdowns were prepared on the automatic coater and then immediately UV cured on the UV dryer with an energy density 10% higher than that determined for the reactivity.

Colour Strength:
Colour strength was determined as ink density for 12 µm drawdowns on Melinex® 506. The corresponding drawdowns were prepared on the automatic coater and then immediately UV cured on the UV dryer with an energy density 10% higher than that determined for the reactivity.

Reactivity:
Reactivity was determined radiometrically as energy density in mJ/cm$^2$ for 12 µm drawdowns on Melinex® 506. The corresponding drawdowns were prepared on the automatic coater and then immediately UV cured on the UV dryer by varying the conveyor belt speed and with that the energy density, until the UV ink film could not be damaged anymore by the thumb twist test. For this the thumb was twisted under pressure clockwise and subsequently anti-clockwise under pressure on the UV ink film surface, until no impression on the UV ink film could be observed anymore. The energy density at this point was defined as the reactivity.

Adhesion:
Adhesion was determined for 12 µm drawdowns on the boPP and PE films prepared on the automatic coater and then immediately UV cured on the UV dryer with an energy density 10% higher than that determined for the reactivity. After 24 h the adhesion was determined by the tape test conducted with the Scotch® Cellophane Film Tape 610 from 3M. The adhesion was visually assessed by the amount of UV ink remaining on the substrate and rated from 5=100% adhesion to 1=0% adhesion.

Acetone Resistance:

Acetone resistance was determined for 12 μm drawdowns on Melinex® 506 prepared on the automatic coater and then immediately UV cured on the UV dryer with an energy density 10% higher than that determined for the reactivity. After 24 h the number of double rubs was recorded for a cotton pad soaked with acetone causing no visible damage of the UV ink film surface anymore; the maximum number of double rubs applied was 100.

4 Preparation of PEA, Heonon Acrylate, Pigment Concentrates and UV Inkjet Inks 4.1 PEA and Heonon Acrylate Preparation Example 1: PEA

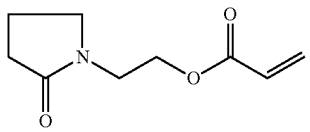

In a 4 L double jacket reactor with column (structured packing Montz A3-500), condensor, reflux splitter, anchor stirrer and lean air introduction ethyl acrylate (2550 g), MeHQ (1.28 g), phenothiazine (128 mg) and hydroxy ethyl pyrrolidin-2-one (1100 g) were added. The mixture was heated up while stirring and lean air was introduced. Ethyl acrylate was distilled off to remove water traces and fresh ethyl acrylate was added. Titanium tetra isopropoxylate (33.3 g) was added at a sump temperature of 67° C. and further heated to 93° C. with a vacuum of 800 mbar. A reflux ratio of 10:1 (reflux:distillate) was adjusted when the mixture started to boil which was adapted in the course of the reaction. The sump temperature increased to 104° C. while the vacuum was adapted to 680 mbar. Sump and distillate samples were taken regularly to monitor the course of the reaction. After 7 h GC of the distillate showed a content of 3.1% ethanol (area %). 300 mL of water were added. After 30 min water and ethyl acrylate were distilled off with a bath temperature of 80° C. at a vacuum of 20 mbar. The product was obtained after filtration in 96% purity (GC area %).

$^1$H NMR (500 MHz, methylene chloride-$d_2$) $\delta_H$=6.37 (dd, J=17.4, 1.5 Hz, 1H), 6.12 (dd, J=17.4, 10.4 Hz, 1H), 5.86 (dd, J=10.4, 1.5 Hz, 1H), 4.25 (t, J=5.6 Hz, 2H), 3.53 (t, J=5.6 Hz, 2H), 3.45 (p, J=6.6 Hz, 2H), 2.33-2.24 (m, 2H), 2.04-1.94 (m, 2H).

IR (KBr) ν (cm$^{-1}$)=2958, 1725, 1689, 1635, 1620, 1495, 1463, 1409, 1289, 1187, 1110, 1068, 988, 811, 654, 570.

MS m/z (EI)=183 (M$^+$), 165, 155, 140, 128, 111, 98, 83, 70, 55, 41.

HRMS calculated for $C_9H_{13}NO_3$ (M$^+$) 183.0895, found 183.0888.

Dynamic viscosity (23° C., shear rate 100 s$^{-1}$): η=18 mPas

Density (20° C., DIN EN ISO 2811-3): ρ=1.1309 g/cm$^3$

Refractive index (20° C.): nd=1.4880

Surface tension (20° C., DIN EN 14370): γ=41 mN/m

Preparation Example 2: Heonon Acrylate

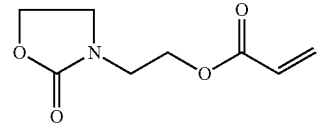

In a 4 L double jacket reactor with column (structured packing Montz A3-500), condensor, reflux splitter, anchor stirrer and lean air introduction ethyl acrylate (1500 g), MeHQ (2 g), acrylic acid (2.5 g) and heonon (694 g) were added. The mixture was heated up while stirring and lean air was introduced. Ethyl acrylate was distilled off to remove water traces and fresh ethyl acrylate was added. Titanium tetra isopropoxylate (14 g) was added at a sump temperature of 79° C. and further heated to 102° C. A reflux ratio of 5:2 (reflux:distillate) was adjusted when the mixture started to boil. Ethyl acrylate was dosed to the reactor in equal amount to the distillate. After 5.5 h 20 g of catalyst were added. The sump temperature raised to 104° C. Sump and distillate samples were taken regularly to monitor the course of the reaction. After 17 h GC shows a content of 98.8% (area %) of heonon acrylate and 1.2% of residual alcohol (ethyl acrylate taken out in the calculation). 150 mL of water were added, the reaction mixture was filtered over a sand filled frit and concentrated in vacuo. The product was obtained after a clear filtration in 830 g yield and a purity of 96% (GC area %).

$^1$H NMR (500 MHz, methylene chloride-$d_2$) $\delta_H$=6.40 (dd, J=17.4, 1.4 Hz, 1H), 6.13 (dd, J=17.4, 10.4 Hz, 1H), 5.88 (dd, J=10.4, 1.4 Hz, 1H), 4.29 (td, J=7.4, 6.8, 2.8 Hz, 4H), 3.68-3.61 (m, 2H), 3.56-3.50 (m, 2H).

IR (KBr) ν (cm-1)=3482, 2918, 1751, 1635, 1619, 1485, 1438, 1410, 1363, 1272, 1188, 1119, 1054, 985, 914, 811, 764, 697, 628, 460.

MS m/z (EI)=186 (M$^+$+H), 177, 167, 154, 141, 130, 122, 113, 100, 69, 56, 42.

HRMS calculated for $C_8H_{11}NO_4$ (M$^+$) 185.0688, found 185.0683.

Dynamic viscosity (23° C., shear rate 100 s$^{-1}$): η=36.2 mPas

Density (20° C., DIN EN ISO 2811-3): ρ=1.2190 g/cm$^3$

Refractive index (20° C.): nd=1.4820

Surface tension (20° C., DIN EN 14370): γ=39 mN/m 4.2 Pigment Concentrates

The pigment concentrates were prepared by adding the solid, already pre-dispersed nanoscale Microlith® J pigment preparations slowly to Laromer® POEA and Laromer® PO 9102 in a dispersion vessel with continuous stirring followed then by high speed mixing with the dissolver at 3200 rpm for 30 minutes (all concentrations are given in weight percent). The resulting liquid pigment concentrates were used for the preparation of the corresponding UV inkjet inks without further characterization.

| Formulation Component | PC Cyan | PC Black |
|---|---|---|
| Microlith ® Blue 7080 J | 12.0% | — |
| Microlith ® Black 0066 J | — | 14.0% |
| Laromer ® POEA | 48.0% | 46.0% |
| Laromer ® PO 9102 | 40.0% | 40.0% |

4.3 UV Inkjet Inks

4.3.1 UV Inkjet Cyan

All colorless formulation compounds were gently mixed with continuous stirring in a dispersion vessel that was then heated to 50° C. on a hotplate to accomplish a complete dissolution of the difficult to solubilize photoinitiators Irgacure® 127 and Irgacure® 819. Afterwards the pigment concentrate PC Cyan was added and the resulting UV inkjet inks were homogenized by mixing for 5 minutes at 600 rpm with the dissolver (all concentrations are given in weight percent).

| Formulation Component | Cyan 1 (comp.) | Cyan 2 (inv.) | Cyan 3 (comp.) | Cyan 4 (inv.) | Cyan 5 (comp.) | Cyan 6 (comp.) | Cyan 7 (comp.) |
|---|---|---|---|---|---|---|---|
| PC Cyan | 20.00% | 20.00% | 20.00% | 20.00% | 20.00% | 20.00% | 20.00% |
| Laromer ® PE 9105 | 11.00% | 11.00% | 11.00% | 11.00% | 11.00% | 11.00% | 11.00% |
| Laromer ® PPTTA | 9.00% | 9.00% | 9.00% | 9.00% | 9.00% | 9.00% | 9.00% |
| Laromer ® DPG-DA | 50.45% | 30.45% | 30.45% | 30.45% | 30.45% | 30.45% | 30.45% |
| PEA | — | 20.00% | — | — | — | — | — |
| NVC | — | — | 20.00% | — | — | — | — |
| HEA | — | — | — | 20.00% | — | — | — |
| VMOX | — | — | — | — | 20.00% | — | — |
| ACMO | — | — | — | — | — | 20.00% | — |
| HDDA | — | — | — | — | — | — | 20.00% |
| Irgacure ® 127 | 3.00% | 3.00% | 3.00% | 3.00% | 3.00% | 3.00% | 3.00% |
| Irgacure ® 819 | 2.00% | 2.00% | 2.00% | 2.00% | 2.00% | 2.00% | 2.00% |
| Irgacure ® TPO | 4.00% | 4.00% | 4.00% | 4.00% | 4.00% | 4.00% | 4.00% |
| EFKA ® SL 3210 | 0.15% | 0.15% | 0.15% | 0.15% | 0.15% | 0.15% | 0.15% |
| Irgastab ® UV 25 | 0.40% | 0.40% | 0.40% | 0.40% | 0.40% | 0.40% | 0.40% |

"inv." means example of the invention;
"comp." means comparative example

4.3.2 UV Inkjet Black

All colorless formulation compounds were gently mixed with continuous stirring in a dispersion vessel that was then heated to 50° C. on a hotplate to accomplish a complete dissolution of the difficult to solubilize photoinitiators Irgacure® 127 and Irgacure® 819. Afterwards the pigment concentrate PC Black was added and the resulting UV inkjet inks were homogenized by mixing for 5 minutes at 600 rpm with the dissolver (all concentrations are given in weight percent).

| Formulation Component | Black 1 (comp.) | Black 2 (inv.) | Black 3 (comp.) | Black 4 (inv.) | Black 5 (comp.) | Black 6 (comp.) | Black 7 (comp.) |
|---|---|---|---|---|---|---|---|
| PC Black | 20.00% | 20.00% | 20.00% | 20.00% | 20.00% | 20.00% | 20.00% |
| Laromer ® PE 9105 | 11.00% | 11.00% | 11.00% | 11.00% | 11.00% | 11.00% | 11.00% |
| Laromer ® PPTTA | 9.00% | 9.00% | 9.00% | 9.00% | 9.00% | 9.00% | 9.00% |
| Laromer ® DPGDA | 50.45% | 30.45% | 30.45% | 30.45% | 30.45% | 30.45% | 30.45% |
| PEA | — | 20.00% | — | — | — | — | — |
| NVC | — | — | 20.00% | — | — | — | — |
| HEA | — | — | — | 20.00% | — | — | — |
| VMOX | — | — | — | — | 20.00% | — | — |
| ACMO | — | — | — | — | — | 20.00% | — |
| HDDA | — | — | — | — | — | — | 20.00% |
| Irgacure ® 127 | 3.00% | 3.00% | 3.00% | 3.00% | 3.00% | 3.00% | 3.00% |
| Irgacure ® 819 | 2.00% | 2.00% | 2.00% | 2.00% | 2.00% | 2.00% | 2.00% |
| Irgacure ® TPO | 4.00% | 4.00% | 4.00% | 4.00% | 4.00% | 4.00% | 4.00% |
| EFKA ® SL 3210 | 0.15% | 0.15% | 0.15% | 0.15% | 0.15% | 0.15% | 0.15% |
| Irgastab ® UV 25 | 0.40% | 0.40% | 0.40% | 0.40% | 0.40% | 0.40% | 0.40% |

"inv." means example of the invention;
"comp." means comparative example

5 Performance Evaluation and Results
5.1 UV Inkjet Cyan
5.1.1 Rheology, Gloss, Colour Strength and Reactivity The UV inkjet inks with PEA are more at the upper end of the typical UV inkjet viscosity window of 25-50 mPa·s at 23° C., but still showing nearly Newtonian flow behavior. These ink viscosity data run parallel to that of the pure monomers.

For gloss and colour strength there are no significant differences between the monomer acrylates, vinyl amides and acryl amides being evaluated.

In terms of reactivity PEA is a fast curing monomer being more reactive than both difunctional monomer acrylates HDDA and DPGDA. PEA is on the same high reactivity level as the other nitrogen containing heterocyclic monomers carrying each an unsaturated, polymerizable group.

| Test Ink | Monomer Acrylate | Viscosity D = 10 sec$^{-1}$ [mPas] | Viscosity D = 100 sec$^{-1}$ [mPas] | Viscosity D = 1000 sec$^{-1}$ [mPas] | Gloss | Ink Density | Reactivity [mJ/cm$^2$] |
|---|---|---|---|---|---|---|---|
| Cyan 1 (comp.) | DPGDA | 34.2 | 33.5 | 32.8 | 116 | 1.79 | 102 |
| Cyan 2 (inv.) | PEA | 46.4 | 45.2 | 41.1 | 117 | 1.77 | 87 |
| Cyan 3 (comp.) | NVC | 34.6 | 34.3 | 33.0 | 117 | 1.83 | 73 |
| Cyan 4 (inv.) | HEA | 67.4 | 57.2 | 49.1 | 115 | 1.79 | 73 |
| Cyan 5 (comp.) | VIMOX | 30.1 | 29.5 | 27.9 | 115 | 1.89 | 60 |
| Cyan 6 (comp.) | ACMO | 39.7 | 38.8 | 36.6 | 116 | 1.84 | 94 |
| Cyan 7 (comp.) | HDDA | 29.7 | 29.1 | 28.4 | 116 | 1.80 | 115 |

5.1.2 Adhesion and Acetone Resistance

PEA is characterized by outstanding adhesion and acetone resistance properties and as least as good as the other monomer acrylates, vinyl amides and acryl amides; vinyl amides and acryl amides are known to show the best adhesion performance of all radiation curable monomers on plastic films difficult to adhere to.

| Test Ink | Monomer Acrylate | Adhesion clear PP film | Adhesion clear PE film | Acetone Resistance |
|---|---|---|---|---|
| Cyan 1 (comp.) | DPGDA | 5 | 5 | 100 double rubs |
| Cyan 2 (inv.) | PEA | 5 | 5 | 100 double rubs |
| Cyan 3 (comp.) | NVC | 5 | 5 | 100 double rubs |
| Cyan 4 (inv.) | HEA | 5 | 5 | 100 double rubs |
| Cyan 5 (comp.) | VIMOX | 5 | 5 | 100 double rubs |
| Cyan 6 (comp.) | ACMO | 1 | 5 | 100 double rubs |
| Cyan 7 (comp.) | HDDA | 2 | 5 | 100 double rubs |

5.2 UV Inkjet Black
5.2.1 Rheology, Gloss, Colour Strength and Reactivity The UV inkjet inks with PEA are in the middle of the typical UV inkjet viscosity window of 25-50 mPa·s at 23° C. and showing excellent Newtonian flow behavior. These ink viscosity data run parallel to that of the pure monomers.

For gloss and colour strength there are no significant differences between the monomer acrylates, vinyl amides and acryl amides being evaluated.

In terms of reactivity PEA is a fast curing monomer being more reactive than both difunctional monomer acrylates HDDA and DPGDA. PEA is on a similar high reactivity level as the other nitrogen containing heterocyclic monomers carrying each an unsaturated, polymerizable group.

| Test Ink | Monomer Acrylate | Viscosity D = 10 sec$^{-1}$ [mPa·s] | Viscosity D = 100 sec$^{-1}$ [mPa·s] | Viscosity D = 1000 sec$^{-1}$ [mPa·s] | Gloss | Ink Density | Reactivity [mJ/cm$^2$] |
|---|---|---|---|---|---|---|---|
| Black 1 (comp.) | DPGDA | 30.5 | 30.2 | 30.0 | 95 | 1.71 | 172 |
| Black 2 (inv.) | PEA | 37.7 | 37.4 | 37.1 | 98 | 1.66 | 126 |
| Black 3 (comp.) | NVC | 32.7 | 32.5 | 32.3 | 99 | 1.73 | 101 |
| Black 4 (inv.) | HEA | 44.3 | 44.0 | 43.7 | 97 | 1.69 | 101 |
| Black 5 (comp.) | VMOX | 25.9 | 25.5 | 25.4 | 98 | 1.72 | 69 |
| Black 6 (comp.) | ACMO | 33.4 | 33.2 | 33.0 | 98 | 1.68 | 127 |
| Black 7 (comp.) | HDDA | 26.1 | 25.9 | 25.8 | 94 | 1.70 | 206 |

5.2.2 Adhesion and Acetone Resistance

PEA is characterized by outstanding adhesion and very good acetone resistance properties and outperforms the other monomer acrylates, vinyl amides and acryl amides in terms of adhesion with vinyl amides and acryl amides are known to show the best adhesion performance of all radiation curable monomers on plastic films difficult to adhere to.

| Test Ink | Monomer Acrylate | Adhesion clear PP film | Adhesion clear PE film | Acetone Resistance |
|---|---|---|---|---|
| Black 1 (comp.) | DPGDA | 1 | 4 | 100 double rubs |
| Black 2 (inv.) | PEA | 5 | 5 | 65 double rubs |
| Black 3 (comp.) | NVC | 1 | 3 | 100 double rubs |
| Black 4 (inv.) | HEA | 1 | 5 | 50 double rubs |

-continued

| Test Ink | Monomer Acrylate | Adhesion clear PP film | clear PE film | Acetone Resistance |
|---|---|---|---|---|
| Black 5 (comp.) | VMOX | 1 | 5 | 35 double rubs |
| Black 6 (comp.) | ACMO | 1 | 5 | 100 double rubs |
| Black 7 (comp.) | HDDA | 5 | 5 | 100 double rubs |

The invention claimed is:

1. A composition, comprising
a) 1.00 to 65.00% by weight of at least one compound of formula (I),

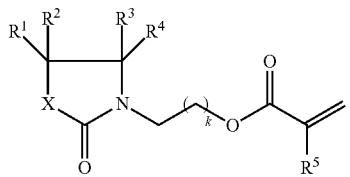

wherein
$R^1$, $R^2$, $R^3$, $R^4$ are each independently H, $C_1$-$C_6$-alkyl, $C_1$-$C_6$-alkoxy, or $C_1$-$C_6$-alkoxy-$C_1$-$C_6$-alkyl;
$R^5$ is H or $C_1$-$C_6$-alkyl;
X is $CR_6R_7$;
$R^6$, $R^7$ are each independently H, $C_1$-$C_6$-alkyl, $C_1$-$C_6$-alkoxy, or $C_1$-$C_6$-alkoxy-$C_1$-$C_6$-alkyl;
k is 1, 2, 3, 4 or 5,
as component A;
b) 1.00 to 60.00% by weight of at least one monomer having two (meth)acrylate groups and having a molecular weight $M_w$ no more than 500 Dalton, as component B;
c) 0 to 25% by weight of at least one monomer having at least three (meth)acrylate groups and having a molecular weight $M_w$ of no more than 600 Dalton, as component C;
d) 1.00 to 30.00% by weight of at least one polymer having at least two (meth)acrylate groups and having a molecular weight $M_w$ of at least 700 Dalton, as component D;
e) 0 to 20.00% by weight of one or more photoinitiators, as component E;
f) 0 to 10.00% by weight of one or more colorants, as component F;
g) 0 to 2.00% by weight of one or more stabilizers, as component G;
h) 0 to 50.00% by weight of one or more further monomers, as component H;
j) 0 to 10.00% by weight of one or more further additives, as component J;
with the proviso that the amount of components A) plus B) is at least 50% by weight, based on the total composition, and that in all cases the amounts of components A to J add up to 100% by weight.

2. The composition according to claim 1, wherein the at least one compound of formula (I) is the compound of formula (Ia)

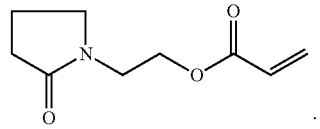

3. The composition according to claim 1, consisting of
a) from 3.00% by weight to 50% by weight of component A;
b) from 5.00% by weight to 55% by weight of component B;
c) from 0.50% by weight to 22.50% by weight of component C;
d) from 3.00% by weight to 25.00% by weight of component D;
e) from 3.00% by weight to 15.00% by weight of component E;
f) from 0.10% by weight to 7.50% by weight of component F;
g) from 0.01% by weight to 1.50% by weight of component G;
h) from 0.00% by weight or from 1.00% by weight to 40.00% by weight of component H;
i) from 0.10% by weight to 7.50% by weight of component J;
wherein in all cases, the amount of components A+B is at least 50% by weight, and the amounts of components A to J add up to 100% by weight.

4. The composition according to claim 1, wherein the at least one monomer having two (meth)acrylate groups of component B has a molecular weight in the range of 150 to 400 Dalton and a dynamic viscosity at 23° C. in the range of from 3 to 150 mPas, measured at a shear rate of 100 $s^{-1}$.

5. The composition according to claim 1, wherein the at least one monomer having at least three (meth)acrylate groups of component C, has a molecular weight in the range of 200 to 550 Dalton and a dynamic viscosity at 23° C. in the range of from 10 to 200 mPas, measured at a shear rate of 100 $s^{-1}$.

6. The composition according to claim 1, wherein the at least one polymer having at least two (meth)acrylate groups of component D has a molecular weight in the range of 1000 to 2000 Dalton and a dynamic viscosity at 23° C. in the range of from 100 to 2500 mPas, measured at a shear rate of 100 $s^{-1}$.

7. The composition according to claim 1, wherein the at least one monomer having two (meth)acrylate groups of component B is selected from the group consisting of monomers of formula (B-1)

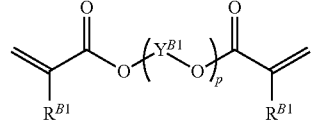

wherein
each $R^{B1}$ is independently H or $CH_3$;
each $Y^{B1}$ is independently ethylene, propylene, or butylene;
p is a number from 1 to 15, and monomers of formula (B-2)

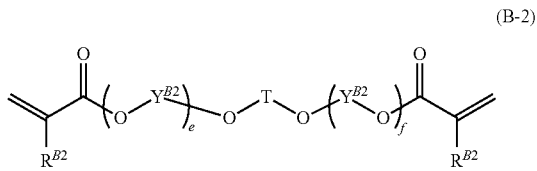

(B-2)

wherein
T is $C_1$-$C_{10}$-alkylene;
each $R^{B2}$ is independently H or $CH_3$;
each $Y^{B2}$ is independently ethylene, propylene, or butylene and
e and f are numbers, with the proviso that e+f is a number from 1 to 10.

8. The composition according to claim 1, wherein the at least one monomer having at least three (meth)acrylate groups of component C, is selected from compounds of formula (C-1),

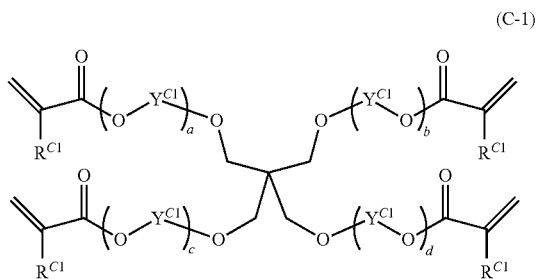

(C-1)

wherein
each $R^{C1}$ is independently H or $CH_3$;
each $R^{C1}$ is independently ethylene, propylene, or butylene;
a, b, c, and d are numbers, with the proviso that a+b+c+d is a number from 1 to 15.

9. The composition according to claim 1, wherein the at least one polymer having at least two (meth)acrylate groups of component D is selected from the groups consisting of
a) amine modified polyether acrylate,
b) polyether acrylates which are not amine modified,
c) polyester acrylates and
d) urethane acrylates.

10. A method for printing, comprising the steps of:
a) applying the composition as claimed in claim 1 onto a substrate;
b) curing the composition.

11. The method according to claim 10, which is a method for inkjet printing.

12. The composition according to claim 1, wherein the composition is used as an ink jet ink and has a viscosity from 25-50 mPas at 23° C.

13. The composition according to claim 1, wherein component D is present from 3.00% by weight to 20.00% by weight and has a molecular weight in the range of from 1500 to 2000 Dalton.

14. The composition according to claim 1, wherein component B is present from 20 to 35% by weight and has a molecular weight in the range of from 150 to 350 Dalton.

15. The composition according to claim 1, consisting of
a) from 5.00% by weight to 30% by weight of component A;
b) from 20% by weight to 35% by weight of component B which are monomers having two (meth)acrylate groups and have a molecular weight in the range of from 150 to 350 Dalton;
c) from 5.00% by weight to 15% by weight of component C;
d) from 7.50% by weight to 15.00% by weight of component D at least one polymer having at least two (meth)acrylate groups and have a molecular weight in the range of from 1500 to 2000 Dalton;
e) from 7.50% by weight to 12.00% by weight of component E;
f) from 1.00% by weight to 5.00% by weight of component F;
g) from 0.05% by weight to 0.50% by weight of component G;
h) from 0.00% by weight or from 1.00% by weight to 25.00% by weight of component H;
i) from 0.00% by weight or from 0.10% by weight to 3.00% by weight of component J;
wherein in all cases, the amount of components A+B is at least 50% by weight, and the amounts of components A to J add up to 100% by weight.

16. The composition according to claim 13, wherein component B is present from 20 to 35% by weight and has a molecular weight in the range of from 150 to 350 Dalton.

* * * * *